US011343235B2

(12) United States Patent
Ingale et al.

(10) Patent No.: US 11,343,235 B2
(45) Date of Patent: May 24, 2022

(54) SECURE DEVICE NOTIFICATIONS FROM REMOTE APPLICATIONS

(71) Applicant: Citrix Systems, Inc., Fort Lauderdale, FL (US)

(72) Inventors: Mukund Ingale, Pompano Beach, FL (US); Georgy Momchilov, Parkland, FL (US); Kireeti Valicherla, Coral Springs, FL (US); Joseph Carson, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/894,012

(22) Filed: Jun. 5, 2020

(65) Prior Publication Data
US 2020/0304478 A1 Sep. 24, 2020

Related U.S. Application Data

(63) Continuation of application No. 15/406,976, filed on Jan. 16, 2017, now Pat. No. 10,715,510.

(51) Int. Cl.
*H04L 29/06* (2006.01)
*H04L 67/10* (2022.01)
*H04L 67/55* (2022.01)
*H04W 12/04* (2021.01)
*H04L 67/01* (2022.01)

(52) U.S. Cl.
CPC ........ *H04L 63/062* (2013.01); *H04L 63/0428* (2013.01); *H04L 67/10* (2013.01); *H04L 67/26* (2013.01); *H04W 12/04* (2013.01); *H04L 67/42* (2013.01)

(58) Field of Classification Search
CPC ... H04L 63/062; H04L 63/0428; H04L 67/10; H04L 67/26; H04W 12/04
USPC ........................................... 726/6
See application file for complete search history.

(56) References Cited

U.S. PATENT DOCUMENTS 8,843,601 B1   9/2014 Zehavi et al.
8,892,748 B1   11/2014 Wootton et al.
8,918,529 B1   12/2014 Batchu et al.
(Continued)

OTHER PUBLICATIONS

"Apple Announces 2048-Bit TLS/SSL Encryption for Push Notification Service;" The Tech Journal; Accessed Dec. 28, 2016; https://thetechjournal.com/electronics/iphone/apple-announces-2048-bit-ttsssl-encryption-for-push-notification-service.xhtml.
(Continued)

*Primary Examiner* — Jacob Lipman
(74) *Attorney, Agent, or Firm* — Banner & Witcoff, Ltd.

(57) ABSTRACT

Methods and systems for securely delivering notifications from remote applications to client devices are described herein. A computing device may listen for notifications from a remote application and receive notification data from the remote application. The computing device may select a notification service for delivery of the notification data to the client device. The computing device may determine whether a client agent application is running as a foreground process on the client device. The computing device may send, to a notification service, notification data for delivery to the client device. At least a portion of the notification data may be encrypted prior to sending to the selected notification service.

23 Claims, 14 Drawing Sheets

(56) References Cited

U.S. PATENT DOCUMENTS

| | | | | |
|---|---|---|---|---|
| 2012/0115455 | A1* | 5/2012 | Rao | H04W 12/35 455/418 |
| 2012/0210415 | A1 | 8/2012 | Somani et al. | |
| 2013/0084896 | A1 | 4/2013 | Barkie et al. | |
| 2013/0336311 | A1* | 12/2013 | Laasik | H04L 65/1069 370/352 |
| 2013/0346521 | A1 | 12/2013 | Arabo et al. | |
| 2014/0106720 | A1 | 4/2014 | Mairs et al. | |
| 2014/0115125 | A1* | 4/2014 | Chen | H04W 76/25 709/219 |
| 2014/0365569 | A1* | 12/2014 | Vyrros | H04L 67/20 709/204 |
| 2015/0199213 | A1* | 7/2015 | Desai | H04W 12/37 718/102 |
| 2016/0048274 | A1 | 2/2016 | Rosenberg | |
| 2017/0201588 | A1* | 7/2017 | Schmidt | H04L 63/0876 |

OTHER PUBLICATIONS

"Patient Engagement: Give Patients the Tools to be Healthier with MyChart;" Epic Software; Accessed Dec. 27, 2016; http://www.epic.com/software.

"Local and Remote Notification Programming Guide: APNs Overview;" Accessed Dec. 27, 2016; https://developer.apple.com/library/content/documentation/NetworkingInternet/Conceptual/RemoteNotificationsPG/APNSOverview.html#//apple_ref/doc/uid/TP4....

"Notifications: Android Developers;" Accessed Dec. 27, 2016; https://developer.android.com/guide/topics/ui/notifiers/notifications.html.

"Notifications and the Notification Area (Windows);" Accessed Dec. 27, 2016; https://msdn.microsoft.com/en-us/library/windows/desktop/ee330740(v=vs.85).aspx.

"Tiles, Badges, and Notifications for UWP Apps;" Accessed Dec. 27, 2016; https://msdn.microsoft.com/en-us/windows/uwp/controls-and-patterns/tiles-badges-notifications.

"Windows Push Notifications Services (WNS) Overview;" Accessed Dec. 27, 2016; https://msdn.microsoft.com/en-us/windows/uwp/controls-and-patterns/tiles-and-notifications-windows-push-notification-services-wns--overview.

Oct. 10, 2018—U.S. Non-final Office Action—U.S. Appl. No. 15/406,976.
Feb. 15, 2019—U.S. Final Office Action—U.S. Appl. No. 15/406,976.
Jul. 29, 2019—U.S. Non-final Office Action—U.S. Appl. No. 15/406,976.
Dec. 16, 2019—U.S. Final Office Action—U.S. Appl. No. 15/406,976.
Mar. 5, 2020—U.S. Notice of Allowance—U.S. Appl. No. 15/406,976.

* cited by examiner

US 11,343,235 B2

SECURE DEVICE NOTIFICATIONS FROM REMOTE APPLICATIONS

CROSS-REFERENCE TO RELATED APPLICATIONS

This application is a continuation of pending U.S. patent application Ser. No. 15/406,976, filed Jan. 16, 2017 and entitled "Secure Device Notifications From Remote Applications." The prior application is incorporated herein by reference in its entirety.

FIELD

Aspects described herein generally relate to computer networking, remote access, and secure device notifications from remote applications. More specifically, aspects described herein relate to receiving notification data from remote applications and securely delivering the notification data to one or more client devices.

BACKGROUND

Remote applications and desktops offer security, manageability, and a lower total cost of ownership. However, their use from certain types of devices, such as mobile devices, may sometimes be challenging. Users may expect applications to be easy to use: intuitive, highly interactive, and available. Remote applications may pose a number of challenges. For example, a long logon time to a remote server hosting applications may reduce the interactivity of the user experience. In addition, client applications for mobile operating systems (OSs) might not be classified as multimedia applications. These client applications may be subject to limitations on computing and network resources. For example, an instance of a client application for a particular operating system might be in the background with limited CPU cycles, or suspended (e.g., in memory but inactive) when the user switches to another local application, such as a native web browser, or may be entirely removed from memory by the operating system if resources on the device are limited. In the meantime, the user's remote application sessions may become disconnected or, depending on administrator policy, logged off and terminated. In some instances, a client application may need to be manually invoked by the user or launched by OS system notifications or by the OS smart scheduler. In the meantime, remote applications might not have the ability to provide real-time notifications to the user. This may reduce the applicability and user experience of hosted applications provided via a client agent.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for receiving notification data from remote applications and securely delivering the notification data to one or more client devices.

A method described herein may comprise initiating a remote connection between a server and a client device. The server may comprise a gateway server in communication with a cloud service. The server may receive, from the client device and via the remote connection, an encryption key and a device token, and the device token may uniquely identify the client device. The server may listen for notifications from a remote application executing on the server and receive notification data from the remote application. In some aspects, the remote application may be configured to be hosted by the server.

The server may select a notification service from a plurality of notification services for delivery of the notification data to the client device. Selecting the notification service for delivery of the notification data to the client device may be based on a device type of the client device. The server may encrypt, using the encryption key, at least a portion of the notification data received from the remote application to generate encrypted notification data. The method may comprise sending, to the selected notification service, the encrypted notification data for delivery of the encrypted notification data to the client device. Sending the encrypted notification data may be performed in response to a determination that a client agent of the client device is inactive or that the client agent is running as a background process on the client device.

In some aspects, after initiating the remote connection between the server and the client device and before receiving notification data from the remote application, the remote connection between the server and the client device may be disconnected. In some aspects, receiving the encryption key and the device token may comprise receiving the encryption key, the device token, and a device type of the client device. Moreover, selecting the notification service may be based on the device type of the client device.

In some aspects, the notification data received from the remote application may comprise a notification display string and application context information. Encrypting at least the portion of the notification data may comprise encrypting the application context information and leaving unencrypted the notification display string.

A method described herein may comprise initiating a remote connection between a server and a client device. The client device may receive, from a notification service, a device token uniquely identifying the client device. The notification service may comprise a push notification service. The client device may send, to a server and via the remote connection, an encryption key and the device token received from the notification service. In some aspects, sending the encryption key and the device token may comprise sending the encryption key, the device token, an identifier associated with the encryption key, and a device type of the client device. The client device may receive, from the notification service, notification data comprising a notification display string and application context information. The application context information may comprise, for example, one or more action ID or one or more trigger ID. The client device may generate, for display on a display of the client device, a notification based at least in part on the received notification data. The notification may comprise at least the notification display string.

In some aspects, after initiating the remote connection between the server and the client device and before receiving the notification data from the notification service, the remote connection between the server and the client device may be disconnected. The notification display string received by the client device might not be encrypted with the encryption key, whereas the application context information received by the client device might be encrypted with the encryption key. In some aspects, a client agent may be used to initiate the remote connection between the server and the client device, and receiving the notification data may be performed by an operating system agent different from the client agent.

In some aspects, the method may comprise receiving, by the client device, a selection of the notification. In response to receiving the selection of the notification, the remote connection between the server and the client device may be re-initiated. Additionally or alternatively, in response to receiving the selection of the notification, the application context information may be decrypted using the encryption key. One or more of the following may be performed: launching, using the decrypted application context information, a client agent of the client device, or launching, using the decrypted application context information, a remote application associated with the notification data.

A computing device described herein may comprise a processor, and memory storing executable instructions. When the instructions are executed by the processor, the computing device may initiate a remote connection between the computing device and a mobile device. The computing device may receive, from the mobile device and via the remote connection, an encryption key and a device token. The device token may uniquely identify the mobile device. The computing device may listen for notifications from an application hosted on the computing device. The computing device may receive notification data from the application. The computing device may select a notification service for delivery of the notification data to the mobile device. The computing device may encrypt, using the encryption key, at least a portion of the notification data received from the application to generate encrypted notification data. The encrypted notification data may be sent, to the selected notification service, for delivery of the encrypted notification data to the mobile device. In some aspects, sending the encrypted notification data may be performed in response to a determination that a client agent of the mobile device is inactive or that the client agent is running as a background process on the mobile device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
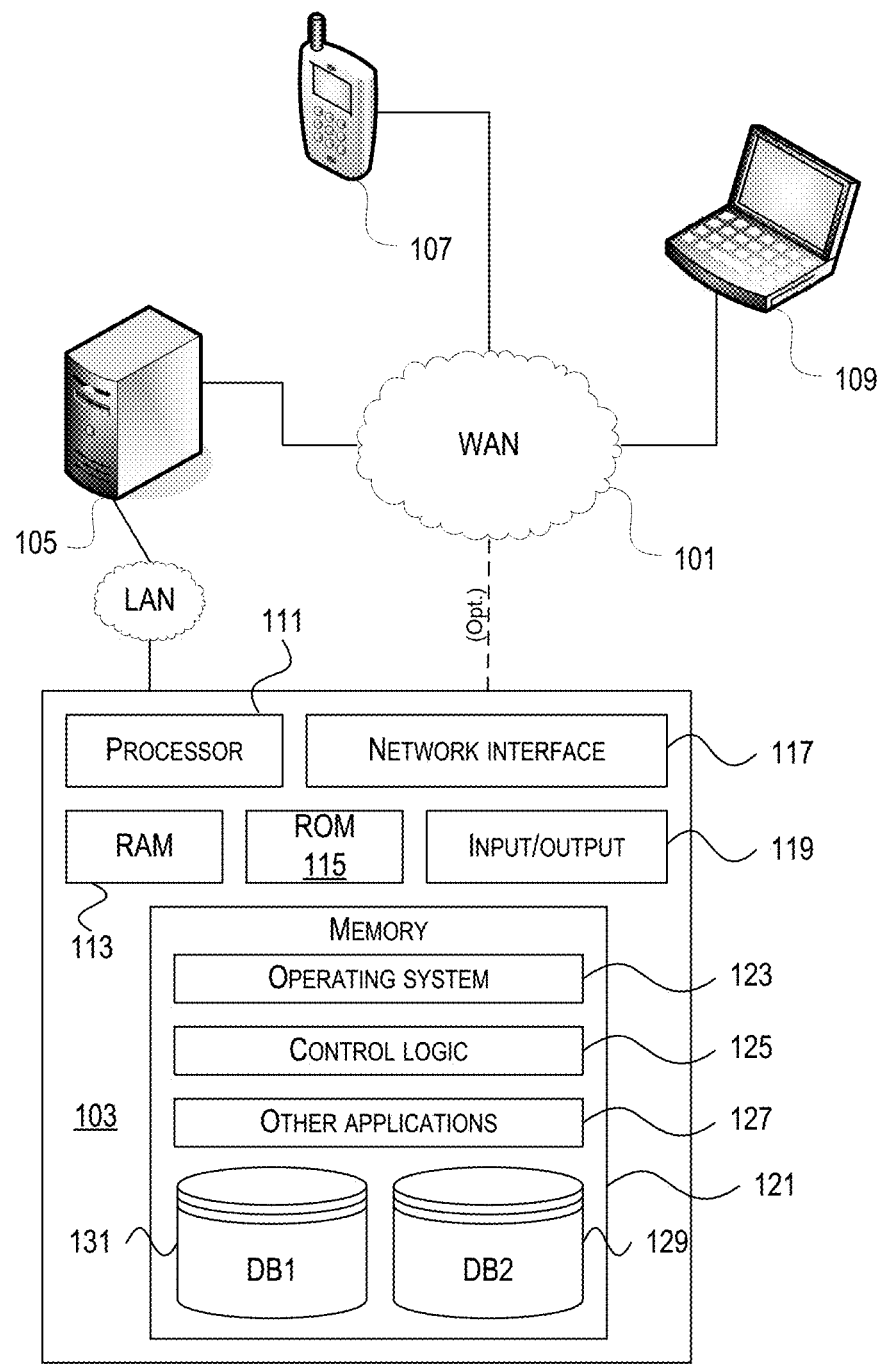
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
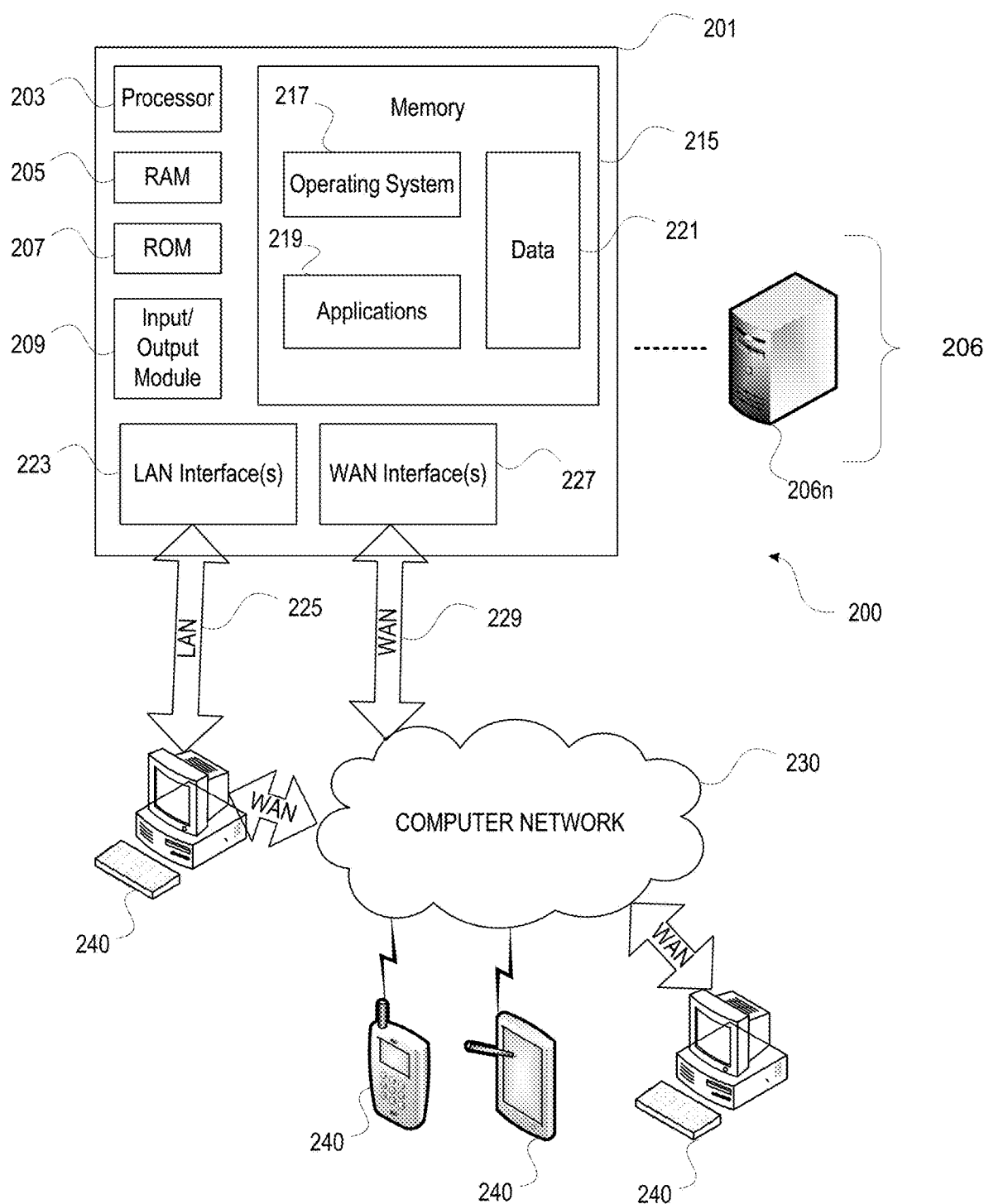
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
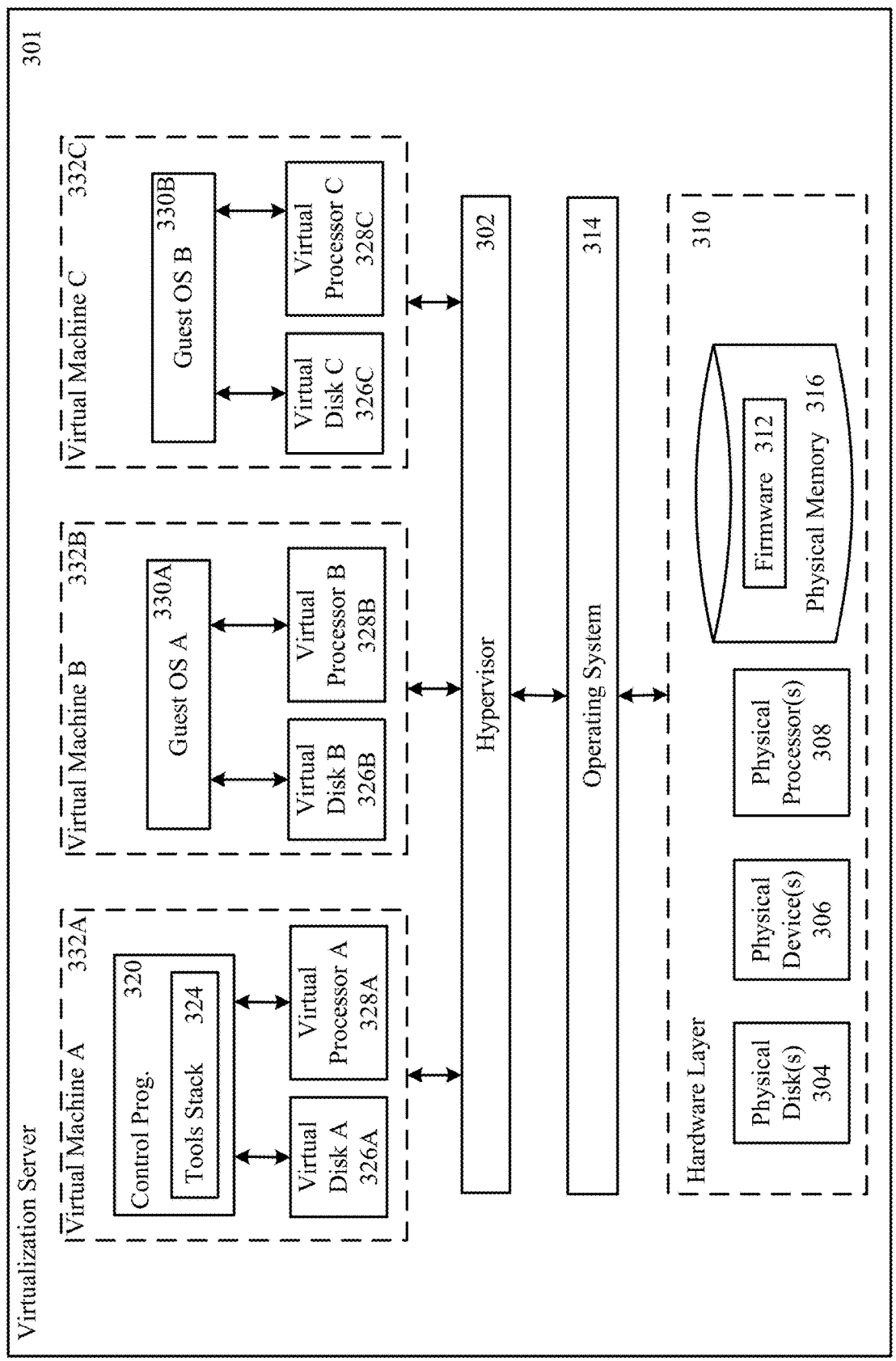
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
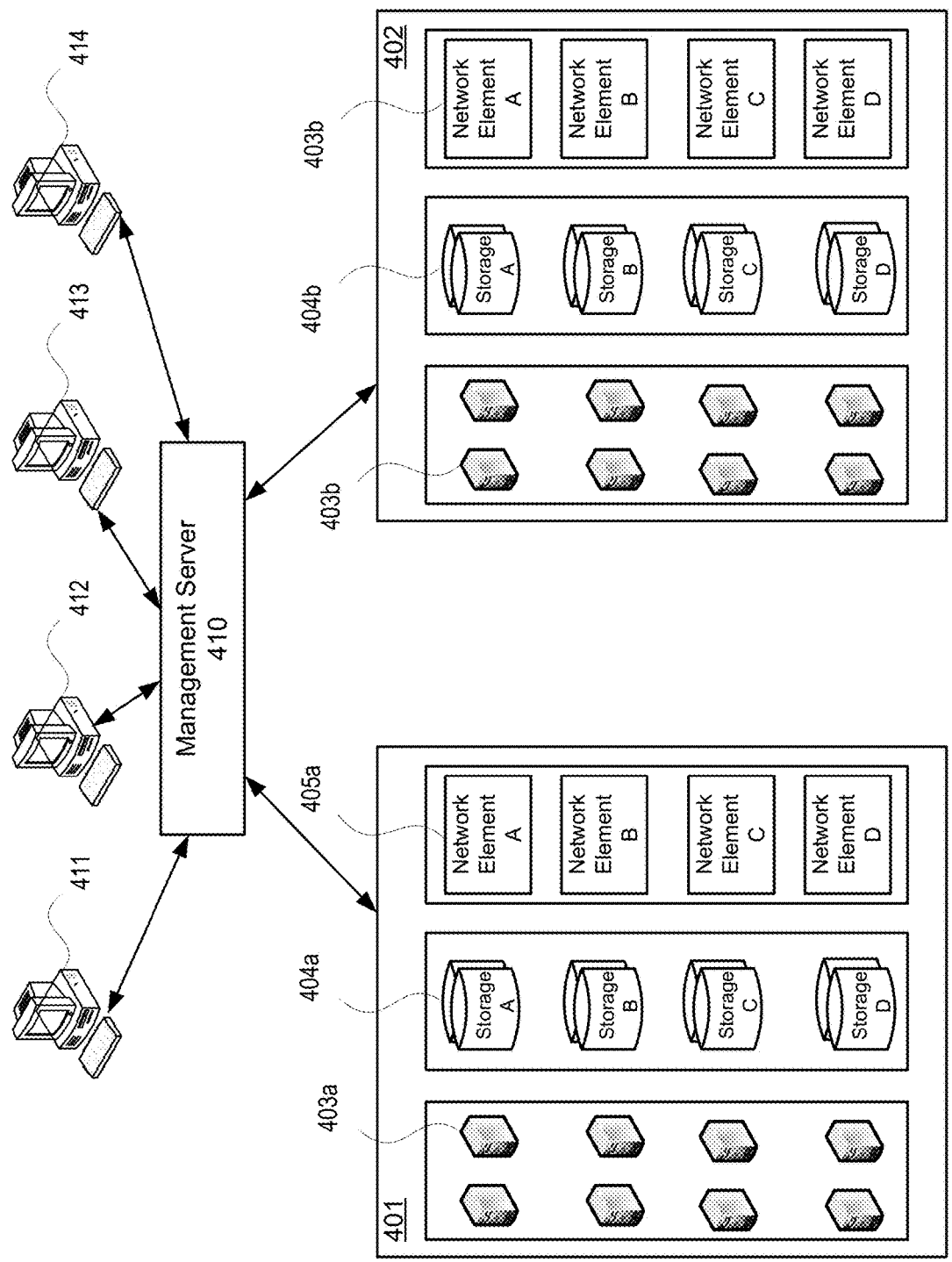
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
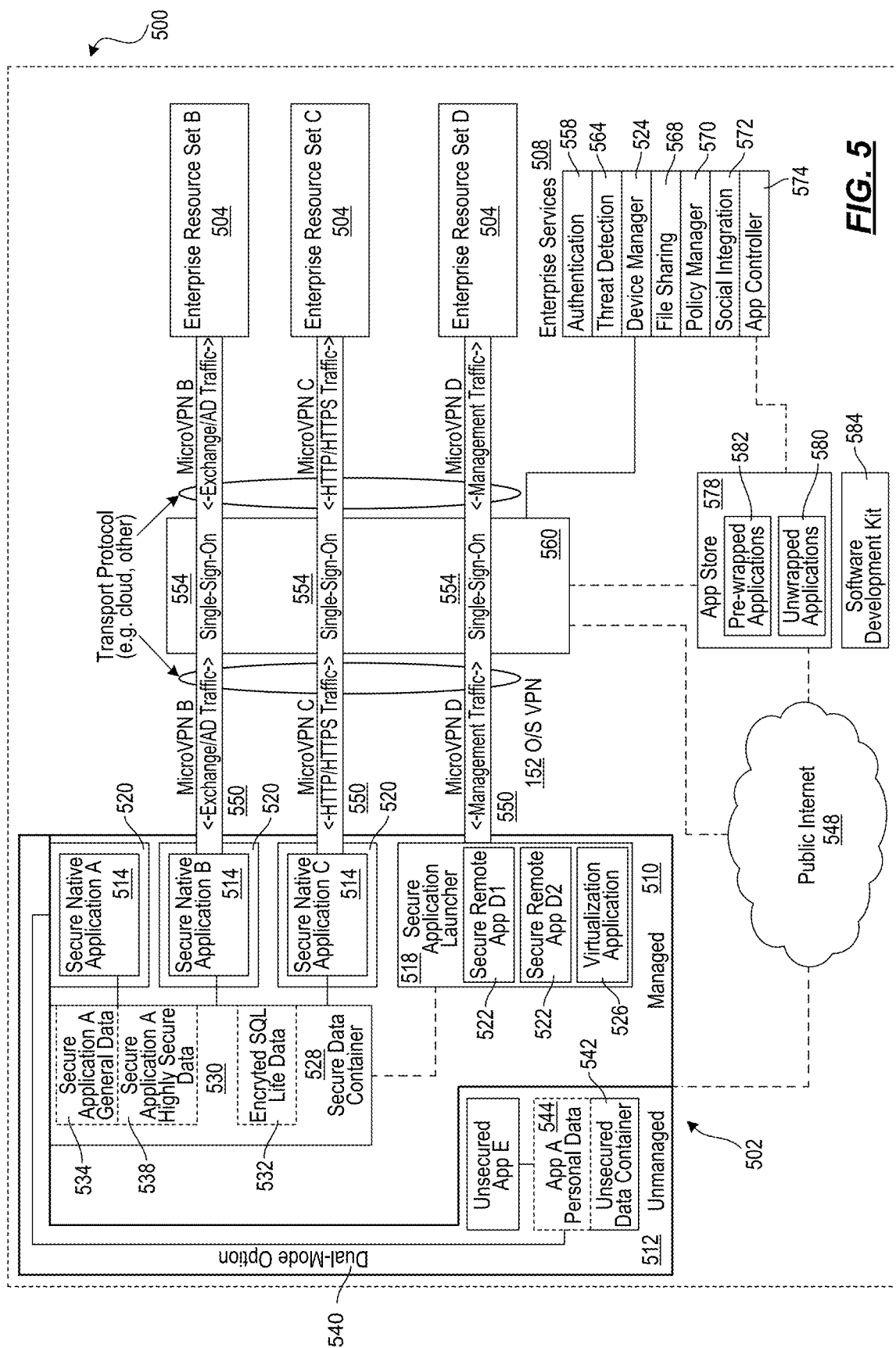
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
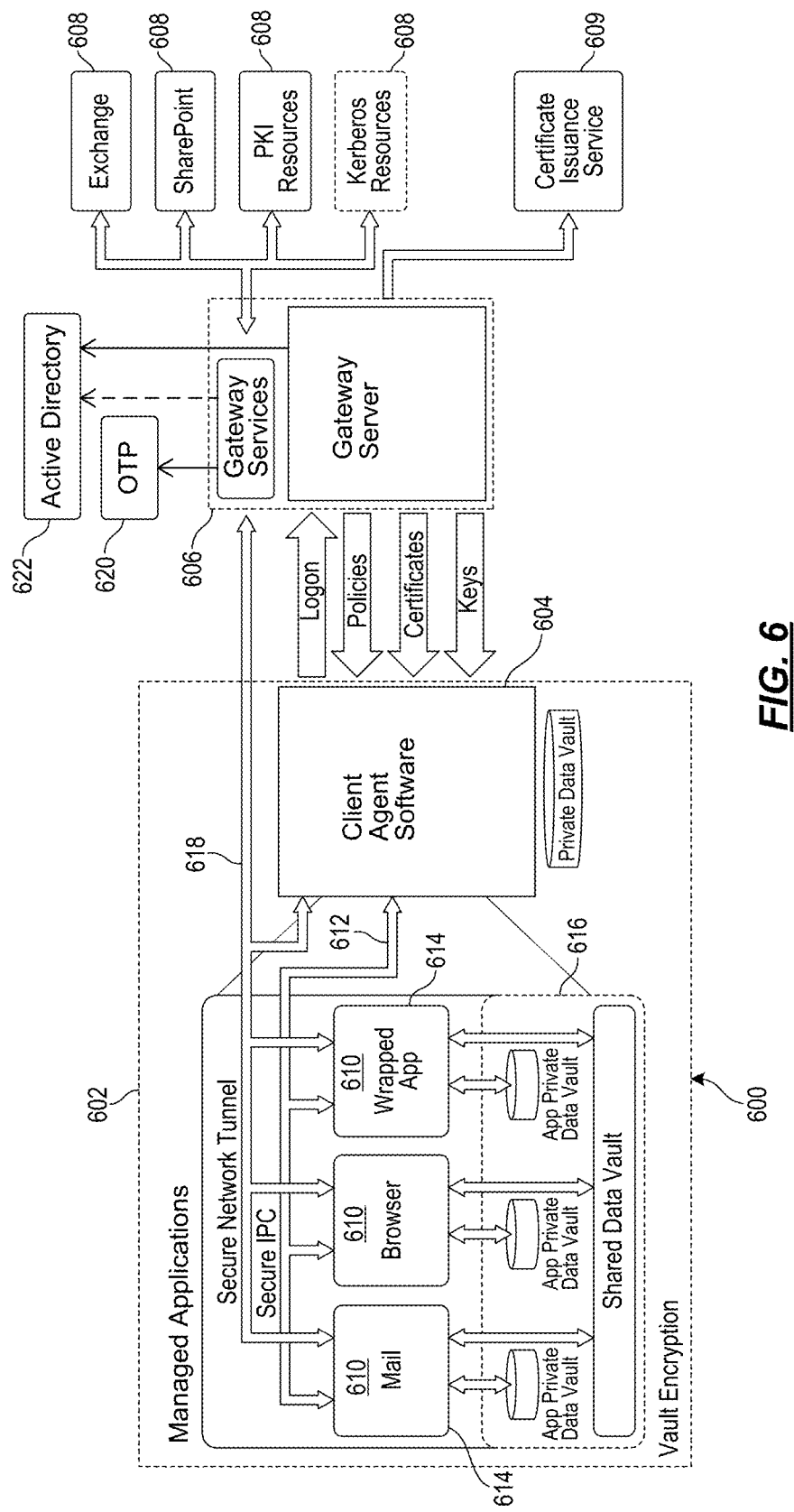
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, SharePoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally, the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one-time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Device Notifications from Remote Applications or Desktops

Aspects described herein may enable remote (e.g., hosted) applications, which may be offline, to deliver secure and interactive notifications to client devices, such as mobile devices. For example, a computing device, via one or more notifications, may notify and prompt a user at the user's mobile device even when the hosted application session is disconnected and/or off-line with respect to the mobile device's client application (e.g., client agent), or when the client application is connected, but in the background or is entirely suspended. Exemplary and non-limiting examples of notifications include a new e-mail, a calendar invite or reminder, a video conference call notification, a custom notification from a medical application, a custom notification from help-desk/customer support Voice over Internet Protocol (VoIP) application, a notification from stock-trading application, etc.

In some aspects, a computing device (e.g., a server hosting a remote application or a remote desktop) may deliver the notifications to the client device (e.g., via the client application) out-of-band with respect to the server, e.g., via a notification service, such as a push notification service (e.g., APPLE push notification service (APNs), Android push notification service, WINDOWS push notification services (WNS), etc.). These push notification services (PNS) may have the ability to wake up or cold-start an application, such as a mobile application. Additional measures may be taken to secure the destination and content of the notifications.

After receiving a notification, the user may follow the prompt, which may be a native prompt, thereby invoking the client agent to the foreground and launching or reconnecting to the respective remote application by also supplying context information (e.g., parameters), such as an e-mail message ID, a calendar item to open, a command to accept a videoconference call, context information of a custom medical application, etc. In some aspects, logon time may be reduced by lingering the remote session and keeping it running in a disconnected state. Aspects described herein may greatly improve the user experience and applicability of remote (e.g., hosted) applications and desktops for use on certain types of devices, such as mobile devices.

Figure 7:
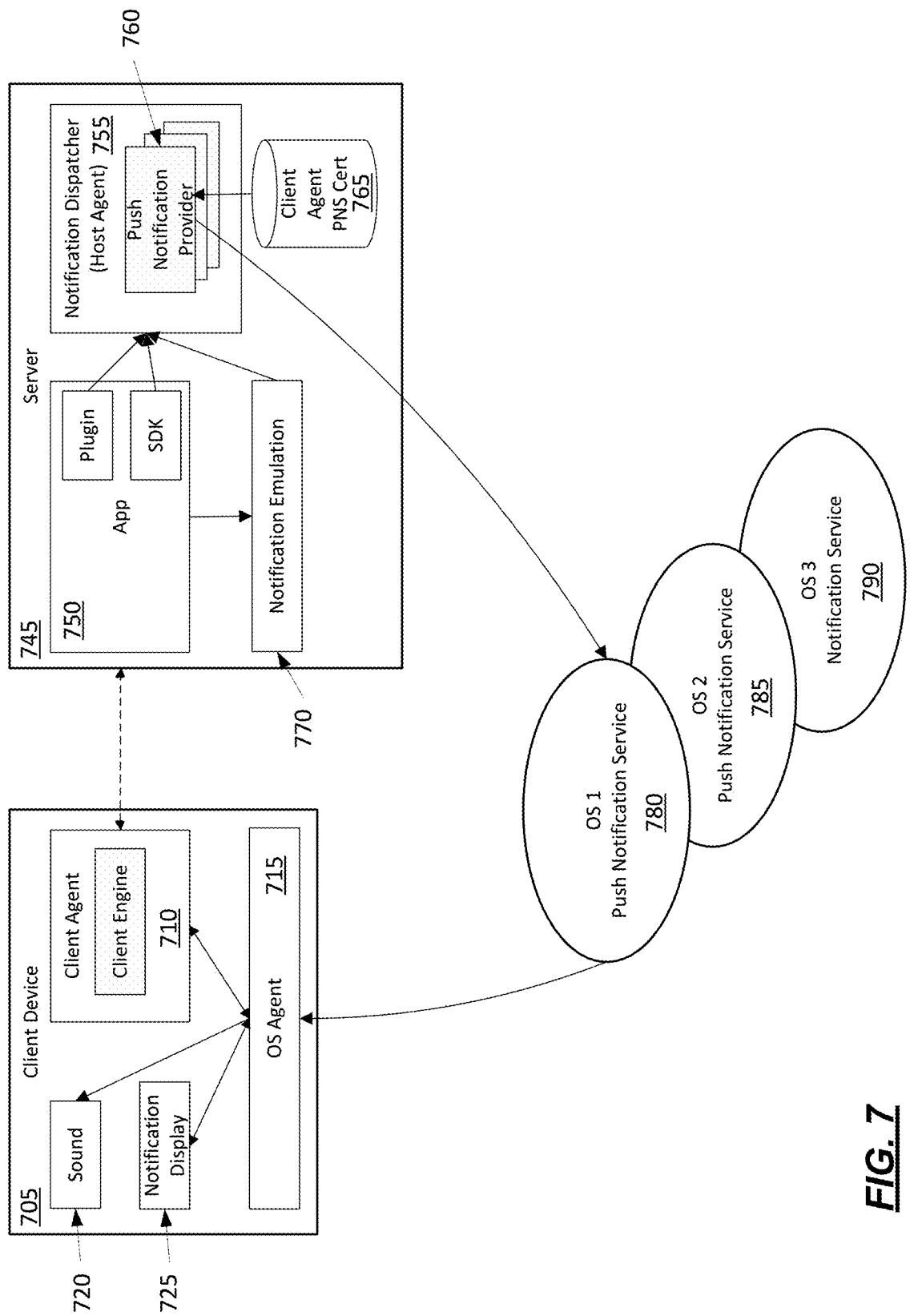
FIG. 7 depicts an illustrative system for secure device notifications from remote applications in accordance with one or more illustrative aspects described herein.

FIG. 7 depicts an illustrative system for secure device notifications from remote applications in accordance with one or more illustrative aspects described herein. The system may comprise a client device 705, which may be a mobile device (e.g., a smartphone, a tablet, a smartwatch, etc.) or another type of client device described above. The client device 705 may comprise a client agent 710, which may perform the same actions (or similar actions) as the client agent 604 illustrated in FIG. 6. For example, the client agent 710 may be used by the client device 705 to securely communicate with the server 745 via a remoting protocol (e.g., HDX/ICA remoting protocol). The client device 705 may also comprise an operating system (OS) agent 715, which may be part of an operating system. The OS agent 715 may facilitate communications between the client device 705 and one or more notification services (e.g., OS 1 Push Notification Service 780, OS 2 Push Notification Service 785, OS 3 Notification Service 790, etc.). The client device 705 may comprise hardware 720 for generating sounds, such as sounds associated with an incoming notification. For example, the hardware 720 may comprise a speaker. The client device 705 may also comprise hardware 725 for displaying notifications, such as a display or other output device for displaying information.

The system may also comprise a server 745. The server 745 may comprise one or more applications 750 remote from the client device 705. The remote application 750 may communicate with the notification dispatcher (e.g., a host agent) 755 via one or more plugins or SDKs. Exemplary and non-limiting examples of applications include an e-mail and/or calendar client, productivity software, a videoconferencing client, a medical application, a Voice over Internet Protocol (VoIP) application, a stock-trading application, etc. The server 745 may comprise a notification dispatcher 755, which may be used to receive notifications (or data associated with notifications) from the remote application 750 and to facilitate dispatching the notification to the client device 705. The notification dispatcher 755 may comprise a push notification provider 760. The push notification provider 760 may request and/or receive, from a database, one or more push notification certificates 765 associated with the client device 705 and/or client agent 710. The push notification provider 760 may also send the relevant notification to one or more push notification service (e.g., OS 1 Push Notification Service 780, OS 2 Push Notification Service 785, OS 3 Notification Service 790, etc.) for delivery to the client device 705. In some aspects, the application 750 may communicate with a notification emulation agent 770, such as WINDOWS system tray (systray) emulation. The notification emulation agent 770 may send notifications (or data associated with notifications) to the notification dispatcher 755.

Figure 8:
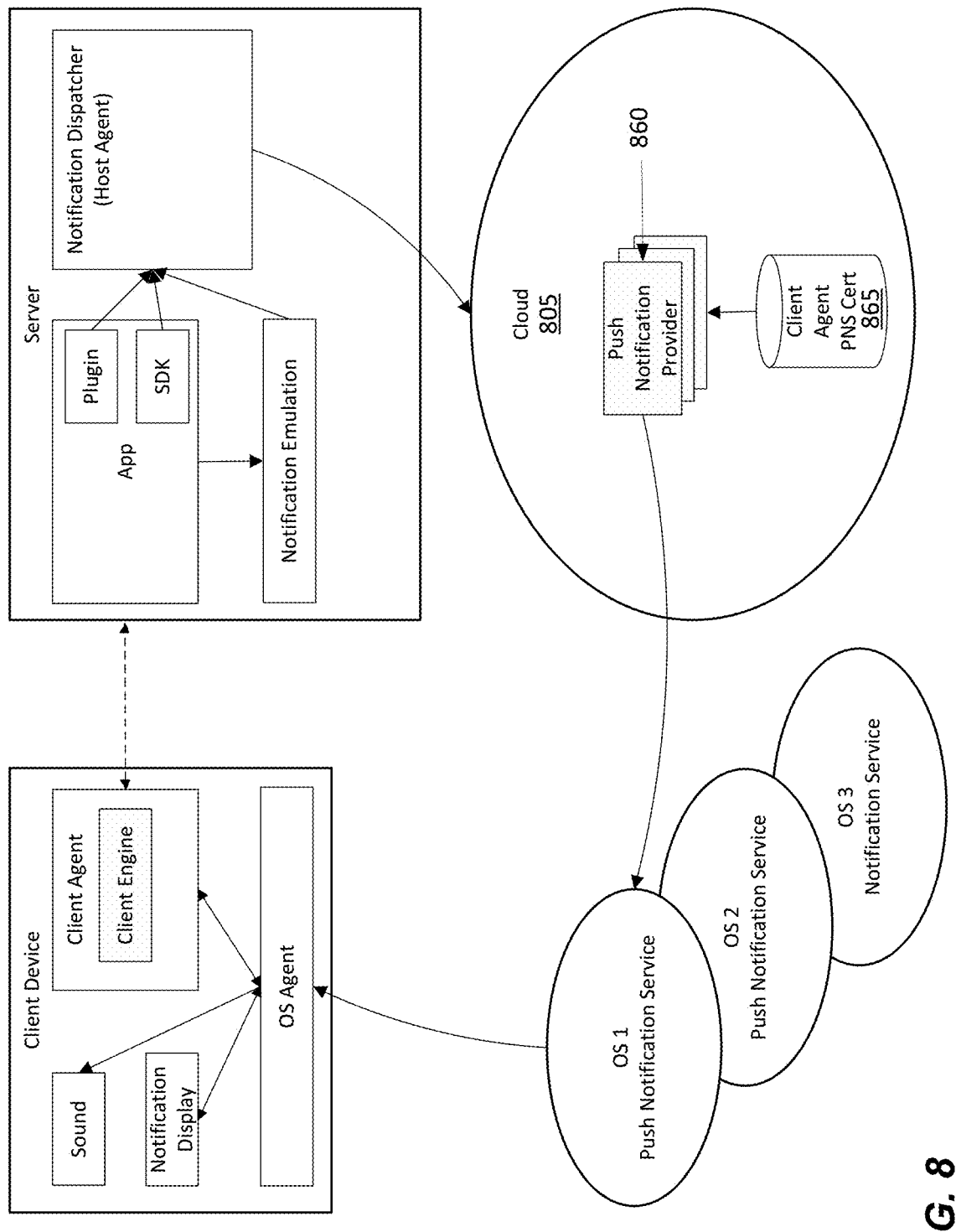
FIG. 8 depicts another illustrative system for secure device notifications from remote applications in accordance with one or more illustrative aspects described herein.

FIG. 8 depicts another illustrative system for secure device notifications from remote applications in accordance with one or more illustrative aspects described herein. The system may comprise a cloud service 805. The cloud service may be responsible for dispatching the received notifications to the respective PNS. The cloud service 805 may comprise a push notification provider 860 and/or a database comprising push notification certificates 865. Data security may be improved by storing the certificates 865 (and/or implementing the push notification provider 860) in the cloud 805.

Figure 9A:
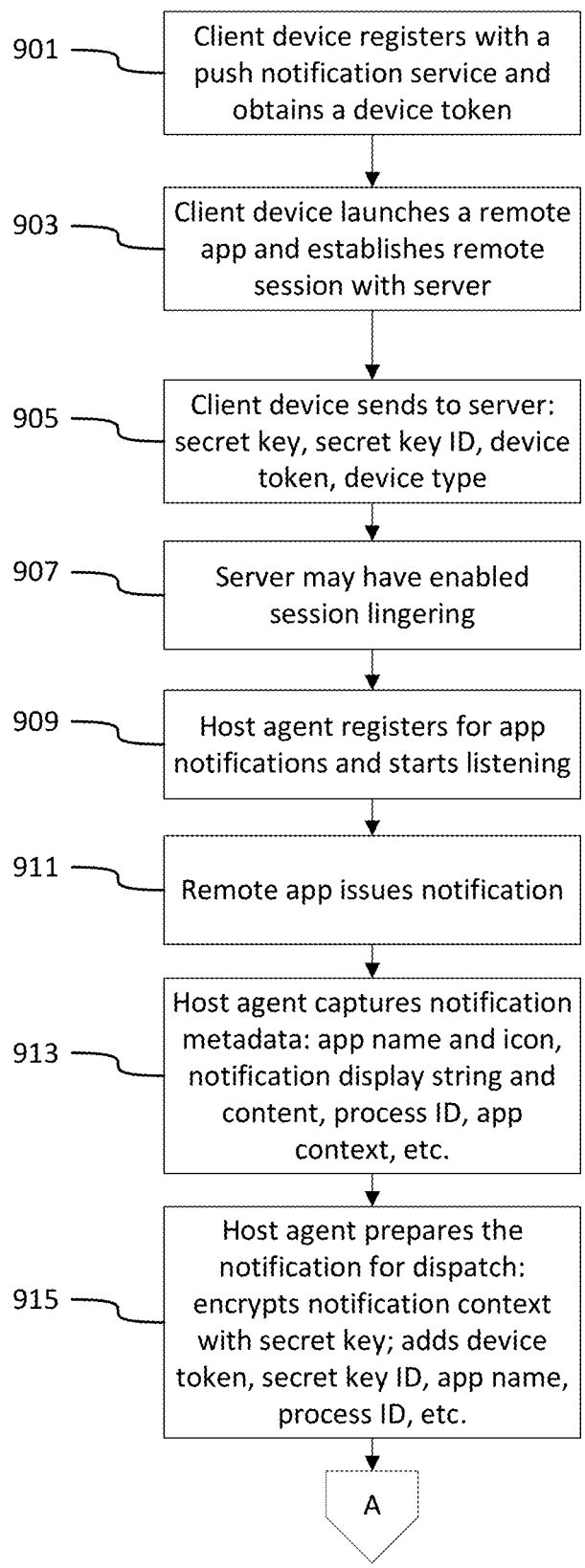
FIGS. 9A-B illustrate at least a portion of an example method for secure device notifications from remote applications in accordance with one or more illustrative aspects described herein.
Figure 9B:
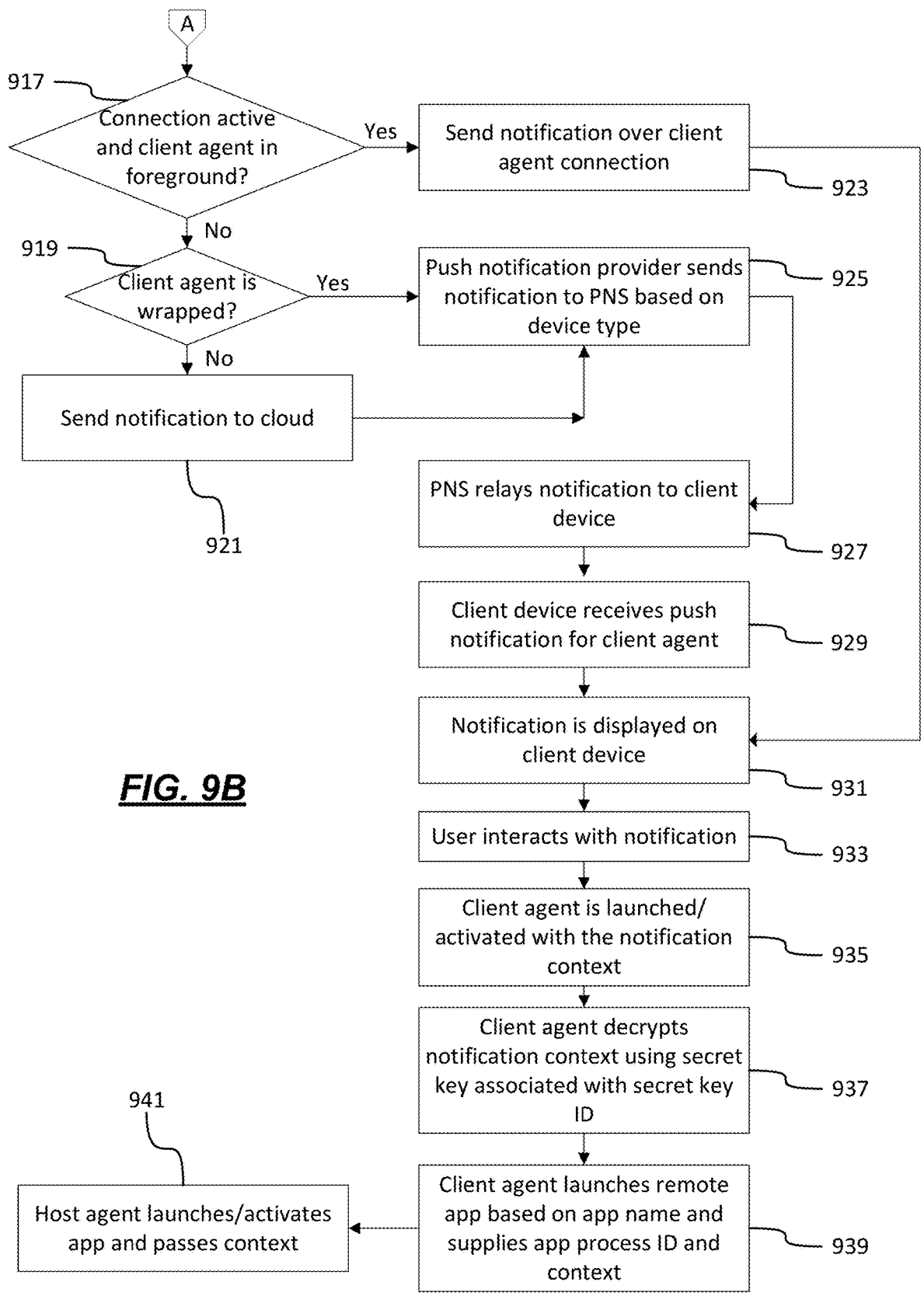

FIGS. 9A-B illustrate at least a portion of an example method for secure device notifications from remote applications in accordance with one or more illustrative aspects described herein. The steps illustrated in FIGS. 9A-B may be performed by one or more of the computing devices illustrated in, for example, FIG. 7 and FIG. 8 (e.g., the client device 705, the server 745, the push notification service(s), and/or the cloud services 805).

In step 901, the client device (e.g., a mobile device), which may be running a client agent application, may register with one or more notification service, such as a push notification service (PNS), and obtain a device token from the PNS. The client device may receive the token from the PNS in response to registering with the PNS. The device token may be used to uniquely identify the client agent or a particular application on a particular client device.

In step 903, the client device may launch a remote application (which may be a published remote application) and/or desktop and may establish a remote session with a server hosting the remote application and/or desktop. The client device may communicate with the server via a remote connection, such as a virtual connection.

In step 905, the client device may send, to the server, a secret key, a secret key ID, a device token, and/or a device type. In some aspects, the client agent of the client device may send this data to the host agent of the server upon session initiation and/or via the remote connection. The secret key may be used for encryption of data sent or received by the client device. As will be described in further detail below, the secret key may be used to encrypt metadata, such as context data, but might not be used to encrypt notification data to be displayed to the user. The secret key ID may be associated with the connection/session between the client device and the server. The device token may uniquely identify the mobile application on the specific client device. The device token may be used for registering for push notifications. For example, the device token may have been previously obtained by the mobile application and/or client device after registration with a push notification service, which may be a 3rd party push notification service, such as APPLE push notification service, ANDROID push notification service, WINDOWS push notification service, and the like. The device type may comprise, for example, the operating system of the client device, such as iOS, ANDROID, WINDOWS Mobile, etc. The device type may be used by the host dispatcher (e.g., a push notification provider) to determine the respective push notification service to communicate with. The shared secret key may be used by the host dispatcher of the server to encrypt some of the notification contents and by the client to decrypt them. The part of the notification to be displayed by the mobile device might not be encrypted because the OS might otherwise not know how to decrypt it. The metadata in the notification, which may contain the context (e.g., remote app and/or action) to be applied, might be encrypted.

In step 907, the server may enable session lingering (or previously had session lingering enabled). In some aspects, session lingering may be enabled in order to keep the hosted application or desktop alive for a longer period of time than normal even if the remote session is disconnected.

In step 909, the server (e.g., via a host agent) may register for application notifications. The server may start listening for notifications from one or more hosted applications.

In step 911, the remote application may issue a notification for the client device, such as for display on a display device of the client device. The server may receive the notification from the remote application via, for example, one or more custom application plugins, such as productivity software plugins, browser plugins, etc. The server may also receive notifications via, for example, WINDOWS system tray (systray) emulation. OS sub-classing may be used. Additionally or alternatively, an existing host agent may be repurposed to redirect captured notifications. The server may hook to WINDOWS toast notifications. Third party applications may use a particular API/SDK to provide notifications to the server.

In step 913, the host agent may capture metadata associated with the notification, such as an app name, an app icon, a notification display string, notification content, an application process ID (e.g., to identify an instance of the application), application context information (e.g., action ID or trigger ID), etc. For example, a custom plugin for an email client may provide the type of the control, e-mail message ID, calendar item ID, configurable action such as reply-all, accept meeting, etc. A custom plugin for a videoconferencing application may include accept call action, etc. The client agent and/or the PNS may provide multiple options to the user for interaction with the notification.

In step 915, the host agent may prepare the captured notification for sending (e.g., dispatch). For example, the host agent may encrypt the notification context with the secret key provided by the client device. The host agent may also add the client device token, a secret key ID, the application name, the process ID, etc. A push notification service, such as a third party PNS, may be selected based on the device type of the client device. As previously discussed, the client device, via the client agent, may have already provided the device type to the server over the remote connection. In some aspects, within the notification dispatcher (host agent), platform specific push notification providers may implement the dispatching logic. The data sent to the PNS may also contain a device token, notification context, including additional metadata, such as a secret key ID (but not the key itself), and notification context data. The notification context data may be encrypted using the negotiated secret key. In some aspects, the notification display string or message and the secret key ID might not be encrypted.

With reference to FIG. 9B, in step 917, the server may determine whether the remote connection with the client agent is active and whether the client agent is in the foreground. If so (step 917: yes), the server may send (e.g., dispatch) the notification to the client device via the client agent connection in step 923. That is, the notification may be dispatched to the client device (via the client agent) over the remote session channel if the client agent is connected to the session and is in the foreground. The server may determine the client agent's status when the client agent sends a status to the server, such as will enter background, did enter foreground, etc. The host at the server may maintain this state, and if the client agent is known to be in the foreground, the captured application notifications may be sent directly over the remote connection. In some aspects, if a mobile application is in the foreground, the native notification, e.g. APNS, might not be presented by the mobile OS.

If the remote connection with the client agent is inactive or the client agent is in the background (step 917: no), the server may proceed to step 919. In step 919, the server may determine whether the client agent is wrapped. If not (step 919: no), the server may send the notification to a cloud service in step 921. That is, the notification may be dispatched to the cloud if the public version of the client agent is used (which may be unwrapped). In some aspects, it might not be secure to provide the client agent private PNS certificate to customers to deploy in their environments. Instead, each customer deployment may talk securely to a cloud service. This may be done with customer-specific credentials, such as a certificate or other credential associated with the specific customer's cloud identity. The cloud service may be responsible for dispatching the received notifications to the respective PNS. For example, the PNS may be chosen based on mobile device type originally provided by the client agent to the server over the remote connection. Thus, the client agent private certificate may be hosted by the cloud, and different certificates may be used based on device type of the client device.

If, on the other hand, the client agent is wrapped (step 919: yes), the server may proceed to step 925. In step 925, a push notification provider, which may run on the server or on the cloud, may send the notification to a push notification service based on a device type (e.g., operating system) of the client device. That is, the notification may be dispatched directly to the PNS if the client agent or a remote application is wrapped with an application management framework, such as by an administrator. This may be possible because the private certificate, e.g. a private SSL certificate such as an APPLE Production iOS Push Certificate, may be owned by the customer. Therefore, the customer may wrap the mobile application with the certificate and also install or provision the same certificate in each server instance. Alternatively, the server agent may talk to a server instance to send the notifications to the third party PNS.

In step 927, the push notification service may relay the notification to the client device. The push notification service may send the notification with one or more of the pieces of data described above (e.g., context information, device ID, etc.).

In step 929, the client device (e.g., via the client agent) may receive the push notification for the client agent. In step 931, the client device may process the notification data, and the notification may be displayed on the client device. In some aspects, the OS agent may receive the notification and display the notification message. The notification message may comprise, for example, an alert or a badge, and/or may comprise a sound. The push notification context may have been encrypted by the PNS. On the other hand, the notification message to be displayed might not have been encrypted by the host dispatcher. The rest of the notification metadata may have been encrypted by the host dispatcher. In some aspects, content not meant to be displayed may be encrypted.

Figure 10:
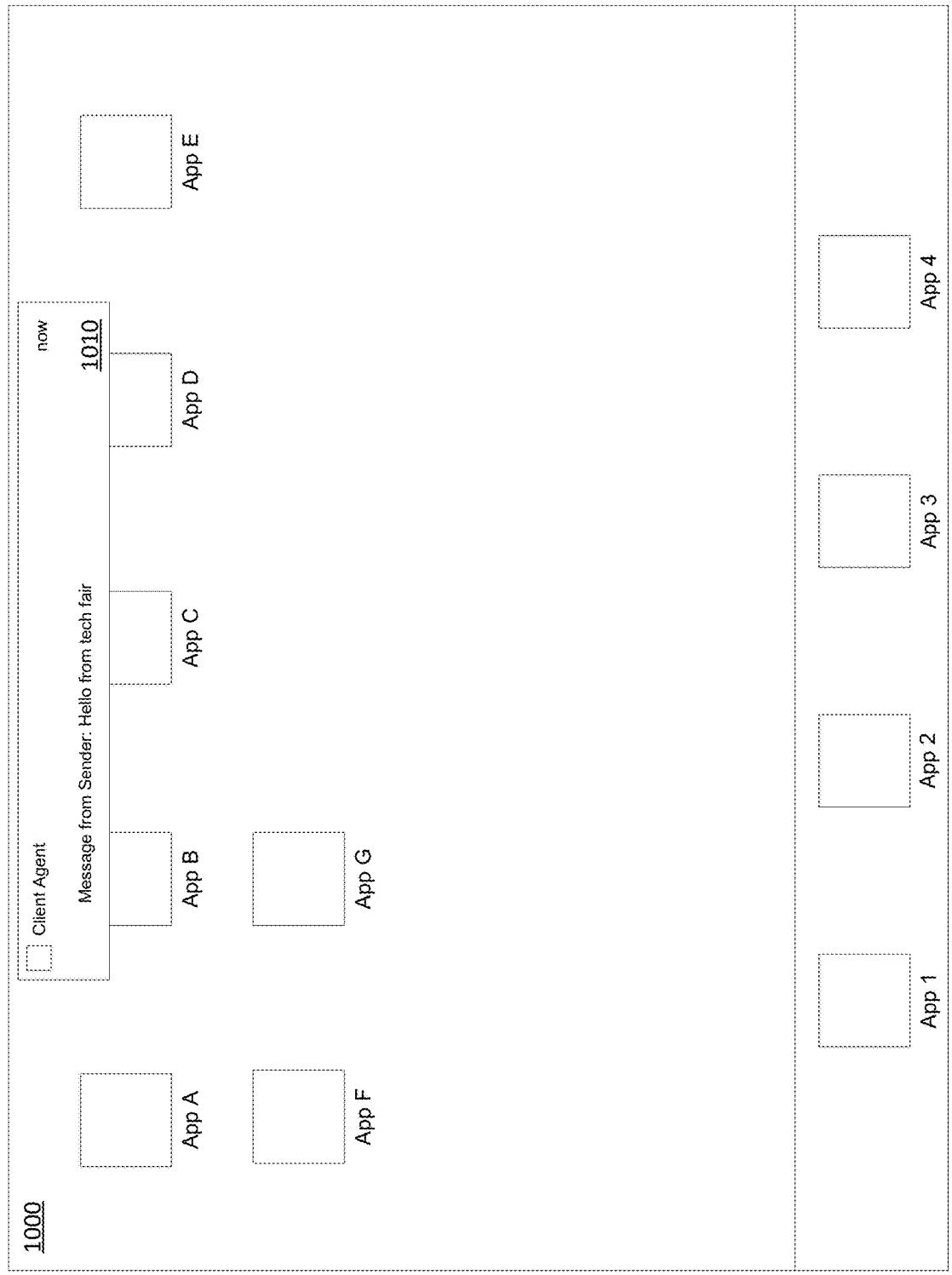
FIG. 10 illustrates an example display screen displaying a notification from a remote application in accordance with one or more illustrative aspects described herein.

FIG. 10 illustrates an example display screen 1000 displaying a notification 1010 from a remote application in accordance with one or more illustrative aspects described herein. For example, the remote application may comprise an email client, and the notification 1010 may display an email message or a portion thereof, such as "Hello from tech fair." The notification 1010 may display other data, such as an identity of a sender of the email message.

Returning to FIG. 9B, in step 933, the user may interact with the notification, such as by tapping on the notification. A plurality of options for interacting with the notification may be provided. For example, for an email client notification, the notification may display an option to read the message, reply to the message, forward the message, or any other action. As another example, a videoconferencing application may display an option to initiate or connect a videoconference call, an option to decline a videoconference request, etc. In some aspects, the client device may request that the user authenticates with the client agent and/or a remote application in response to the user tapping on the notification.

Figure 11:
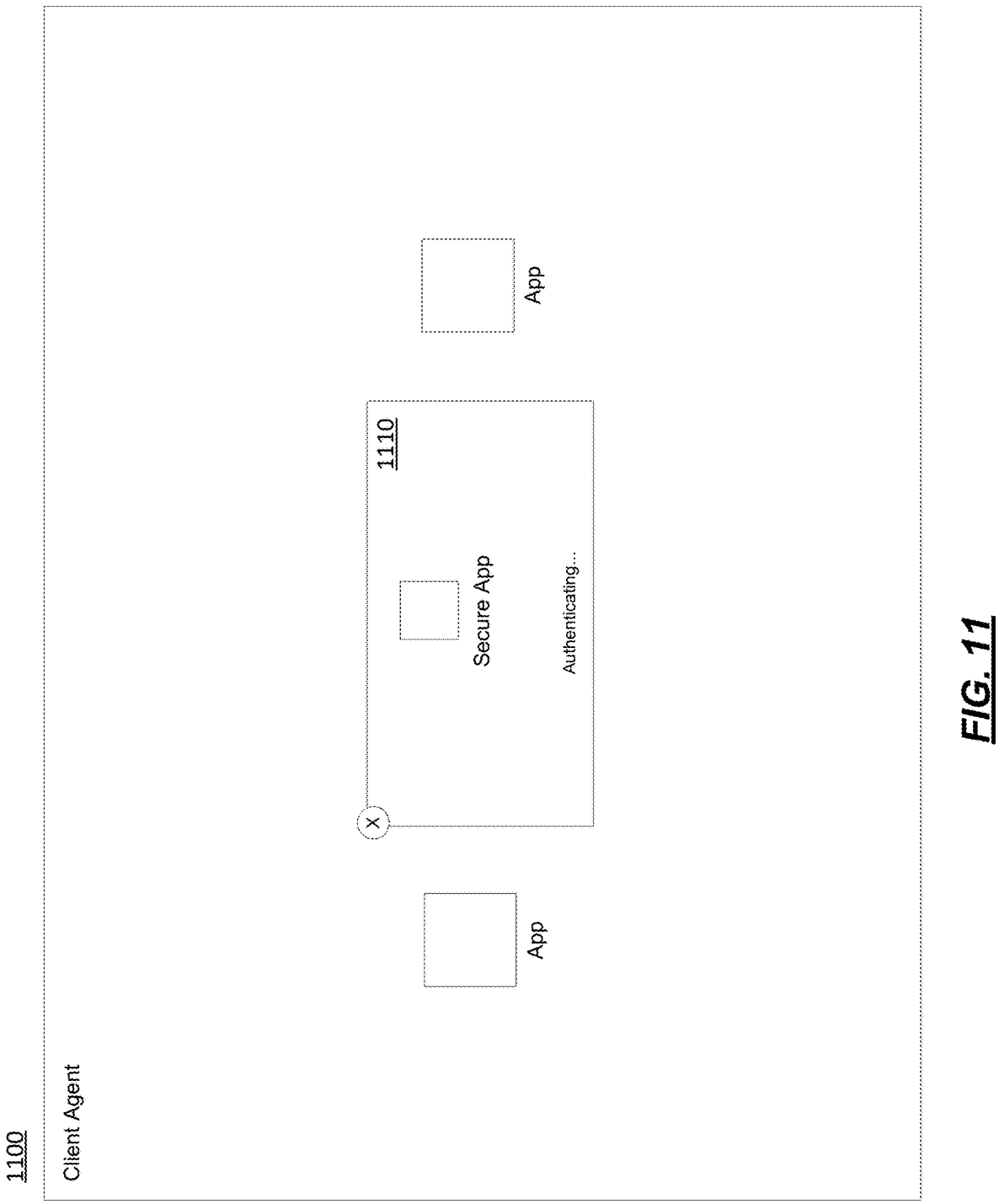
FIG. 11 illustrates an example display screen displaying a progress of authentication with a remote application in accordance with one or more illustrative aspects described herein.

FIG. 11 illustrates an example display screen 1100 displaying a progress of authentication with a remote application in accordance with one or more illustrative aspects described herein. For example, the client device may display a message 1110 indicating a progress of authentication with the client agent or a secure remote application. The example display screen 1100 may be displayed in response to the user selecting the notification 1010 illustrated in FIG. 10.

Figure 12:
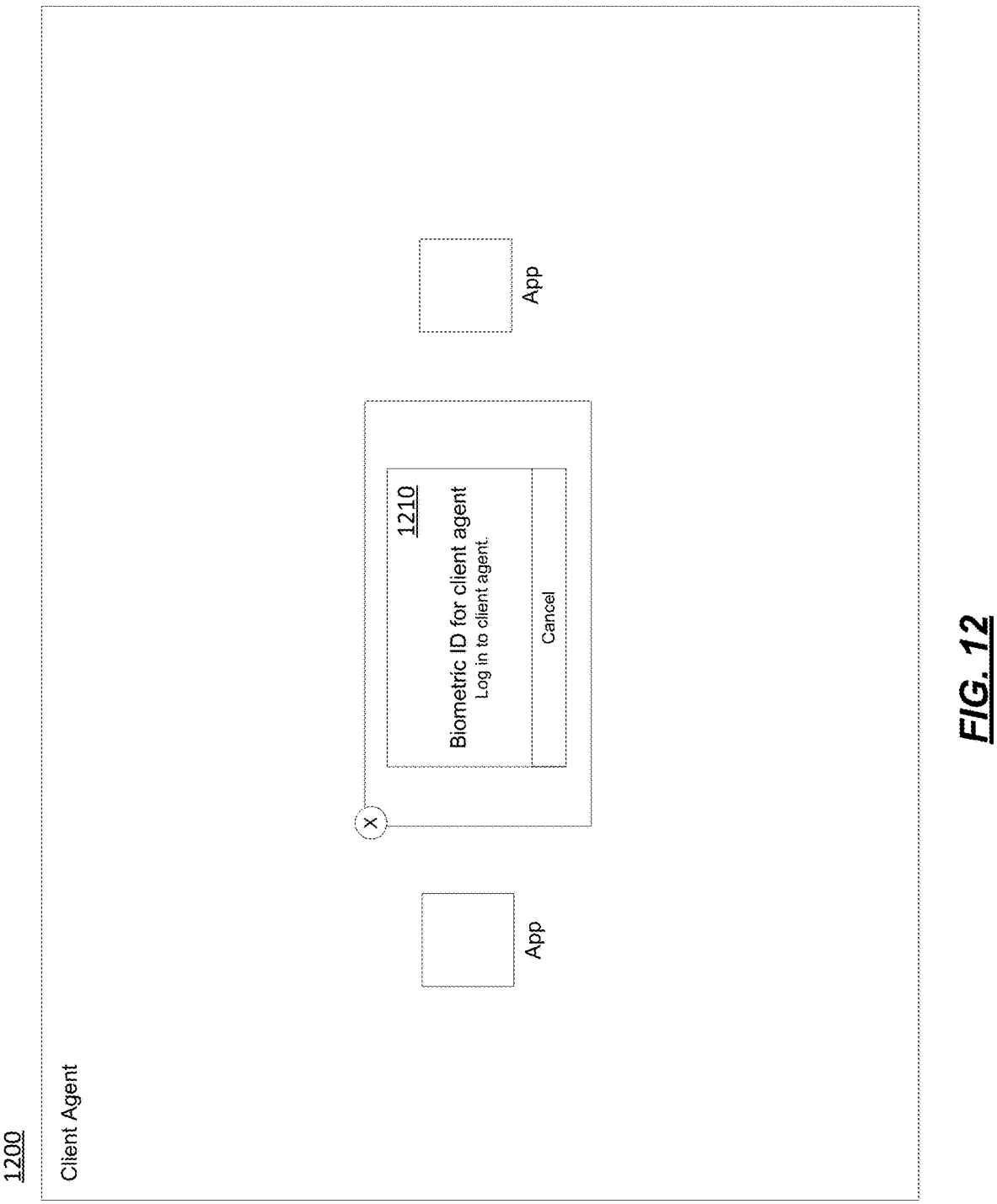
FIG. 12 illustrates another example display screen displaying a progress of authentication with a remote application in accordance with one or more illustrative aspects described herein.

FIG. 12 illustrates another example display screen 1200 displaying a progress of authentication with a remote application in accordance with one or more illustrative aspects described herein. For example, the client device may display a message 1210 requesting the user to provide credentials, such as biometrics (e.g., a fingerprint) or a username and/or password. The example display screen 1200 may be displayed in response to the user selecting the notification 1010 illustrated in FIG. 10 and/or after the example display screen 1100 illustrated in FIG. 11 is displayed on the client device.

Returning to FIG. 9B, in step 935, the client agent at the client device may be launched and/or activated with the notification context information. For example, the associated client application, e.g. the client agent, may be launched with parameters containing the push notification. The client agent may retrieve the secret key based on the secret key ID in the notification. The example display screens illustrated in FIGS. 11 and 12 may occur after or within step 935, e.g., after the client agent is launched and/or activated with the notification context information.

In step 937, the client agent may decrypt the notification context information (and other encrypted metadata) using the secret key associated with the secret key ID. The data (e.g., secret key ID, secret key, etc.) may be stored or retrieved to/from the application framework management vault if the client agent is wrapped or otherwise managed.

In step 939, the client agent may launch the remote application that generated the notification based on the application name. The client agent may supply, to the server, any additional context information, such as the remote application process ID, action, trigger, and/or context information. This may be done over a remote session control virtual channel.

In step 941, the host agent at the server may launch and/or activate the application and pass context information. The host agent may apply a command sent by the client agent (e.g., read an email message, reply to the email message, connect a videoconference call, etc.). For example, a specific email message may be opened by the hosted e-mail client. The process ID may be useful for the host agent to disambiguate between potentially multiple instances of the same published application sharing the remote session.

Figure 13:
FIG. 13 illustrates an example display screen displaying data associated with a remote application in accordance with one or more illustrative aspects described herein.

FIG. 13 illustrates an example display screen 1300 displaying data associated with a remote application in accordance with one or more illustrative aspects described herein. For example, the client device may display an email message, including the sender, the recipient, the subject line, date and time of the message, the body of the message, etc.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a server via a remote connection between the server and a client agent application executing on a client device, a device token that uniquely identifies the client device;
receiving notification data from a remote application executing on the server, the remote application being accessible by the client device via the client agent application;
determining, by the server, whether the client agent application is running as a foreground process or a background process on the client device;
determining, by the server, whether the client agent application is wrapped by a secure application wrapper; and
sending, to a notification service and based on a determination that the client agent application is running as the background process on the client device and a determination that the client agent application is wrapped by the secure application wrapper, the notification data for delivery to the client device.

2. The method of claim 1, further comprising:
receiving, by the server from the client device via the remote connection, an encryption key; and
encrypting, by the server and using the encryption key, at least a portion of the notification data received from the remote application to generate encrypted notification data,
wherein the sending the notification data comprises sending the encrypted notification data.

3. The method of claim 1, wherein the determination that the client agent application is running as the background process comprises determining that the client agent application is inactive.

4. The method of claim 1, wherein the server comprises a gateway server in communication with a cloud service.

5. The method of claim 1, wherein the secure application wrapper comprises at least one of:
an integrated policy that is executed on the client device, or
metadata associating the client agent application to an enterprise resource that is hosted remotely.

6. The method of claim 1, further comprising:
selecting, by the server and based on an operating system of the client device, the notification service, from a plurality of notification services, for delivery of the notification data to the client device, wherein a first notification service of the plurality of notification services corresponds to a first operating system, and a second notification service of the plurality of notification services corresponds to a second operating system different from the first operating system.

7. The method of claim 6, wherein the selecting the notification service for delivery of the notification data to the client device is based on a device type of the client device.

8. The method of claim 1, wherein the notification data received from the remote application comprises a notification display string and application context information.

9. The method of claim 8, further comprising encrypting the application context information and leaving unencrypted the notification display string.

10. A method comprising:
receiving, by a server via a remote connection between the server and a client agent application executing on a client device, a device token that uniquely identifies the client device;
receiving notification data from a remote application executing on the server, the remote application being accessible by the client device via the client agent application;
receiving, by the server from the client device, an indication that the client agent application will run as a background process; and
sending, to a notification service and based on the received indication and a determination that the client agent application is wrapped by a secure application wrapper, the notification data for delivery to the client device.

11. The method of claim 10, further comprising:
receiving, by the server from the client device via the remote connection, an encryption key; and
encrypting, by the server and using the encryption key, at least a portion of the notification data received from the remote application to generate encrypted notification data,
wherein the sending the notification data comprises sending the encrypted notification data.

12. The method of claim 10, wherein the server comprises a gateway server in communication with a cloud service.

13. The method of claim 10, wherein the secure application wrapper comprises at least one of:
an integrated policy that is executed on the client device, or
metadata associating the client agent application to an enterprise resource that is hosted remotely.

14. The method of claim 10, further comprising:
selecting, by the server and based on an operating system of the client device, the notification service, from a plurality of notification services, for delivery of the notification data to the client device, wherein a first notification service of the plurality of notification services corresponds to a first operating system, and a second notification service of the plurality of notification services corresponds to a second operating system different from the first operating system.

15. The method of claim 14, wherein the selecting the notification service for delivery of the notification data to the client device is based on a device type of the client device.

16. The method of claim 10, wherein the notification data received from the remote application comprises a notification display string and application context information.

17. The method of claim 16, further comprising encrypting the application context information and leaving unencrypted the notification display string.

18. A computing device comprising:
one or more processors; and
memory storing instructions that, when executed by the one or more processors, cause the computing device to:
receive, via a remote connection with a client agent application executing on a client device, a device token that uniquely identifies the client device;
receive notification data from a remote application executing on the computing device, the remote application being accessible by the client device via the client agent application;
determine whether the client agent application is running as a foreground process or a background process on the client device;
determine whether the client agent application is wrapped by a secure application wrapper; and
send, to a notification service and based on a determination that the client agent application is running as the background process on the client device and a determination that the client agent application is wrapped by the secure application wrapper, the notification data for delivery to the client device.

19. The computing device of claim 18, wherein the instructions, when executed by the one or more processors, further cause the computing device to:
    select, based on an operating system of the client device, the notification service, from a plurality of notification services, for delivery of the notification data to the client device, wherein a first notification service of the plurality of notification services corresponds to a first operating system, and a second notification service of the plurality of notification services corresponds to a second operating system different from the first operating system.

20. The computing device of claim 18, wherein the instructions, when executed by the one or more processors, further cause the computing device to:
    receive, from the client device via the remote connection, an encryption key; and
    encrypt, using the encryption key, at least a portion of the notification data received from the remote application to generate encrypted notification data, and
    wherein the instructions, when executed by the one or more processors, cause the computing device send the notification data by sending the encrypted notification data.

21. The computing device of claim 18, wherein the notification data received from the remote application comprises a notification display string and application context information, and
    wherein the instructions, when executed by the one or more processors, further cause the computing device to encrypt the application context information and leave unencrypted the notification display string.

22. The computing device of claim 18, wherein the instructions, when executed by the one or more processors, cause the computing device to determine that the client agent application is running as the background process by determining that the client agent application is inactive.

23. The computing device of claim 18, wherein the secure application wrapper comprises at least one of:
    an integrated policy that is executed on the client device, or
    metadata associating the client agent application to an enterprise resource that is hosted remotely.

* * * * *